US012321978B2

(12) United States Patent
Johnson et al.

(10) Patent No.: US 12,321,978 B2
(45) Date of Patent: Jun. 3, 2025

(54) ORDER ASSEMBLY METHODS AND SYSTEM FOR MULTIPLE POINTS OF SALE

(71) Applicant: TARGET BRANDS, INC., Minneapolis, MN (US)

(72) Inventors: Brianna L. Johnson, New Braunfels, TX (US); Andria M. Rambow, Rogers, MN (US); Jennifer A. Tso, Minneapolis, MN (US); Kylene N. Webster, Shakopee, MN (US); Arivanandam Sankaranarayanan, Woodbury, MN (US); Syed G. H. Mohammed, Maple Grove, MN (US); Michael T. Johnson, Minneapolis, MN (US); Slade J. Baumann, Minneapolis, MN (US); Charles T. Utz, Rosemount, MN (US); Daniel N. Tawfik, Maple Grove, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 196 days.

(21) Appl. No.: 18/097,022

(22) Filed: Jan. 13, 2023

(65) Prior Publication Data
US 2024/0242264 A1 Jul. 18, 2024

(51) Int. Cl.
*G06Q 30/00* (2023.01)
*G06Q 30/0601* (2023.01)
(52) U.S. Cl.
CPC ..... *G06Q 30/0635* (2013.01); *G06Q 30/0641* (2013.01)
(58) Field of Classification Search
CPC ................ G06Q 30/0635; G06Q 30/0641
(Continued)

(56) References Cited

U.S. PATENT DOCUMENTS

D795,893 S 8/2017 Kim et al.
D797,774 S 9/2017 Park et al.
(Continued)

FOREIGN PATENT DOCUMENTS

CN 305250394 7/2019
CN 306093059 10/2020
(Continued)

OTHER PUBLICATIONS

Da Silva Freitas, Filipe José. (2022). Wintouch cloud—delivery module (Order No. 30821565). Available from ProQuest Dissertations & Theses Global. (2925078640). Retrieved from https://www.proquest.com/dissertations-theses/wintouch-cloud-delivery-module/docview/2925078640/se-2 (Year: 2022).*
(Continued)

*Primary Examiner* — Arielle E Weiner
(74) *Attorney, Agent, or Firm* — Dorsey & Whitney LLP

(57) ABSTRACT

A computer implemented method that includes displaying information about an order including a first product and a second product, where the first product originates at a first retailer and the second product originates at a second retailer. A first user input corresponding to an initiation of production of the first product is received from the first user device and a first visual status is displayed at the second user device. A second user input corresponding to a completion of the production of the first product is received from the first user devices and the first visual status is updated to a second visual status reflecting the completion. A third user input corresponding to an assembly of the order is received from the second user device and a notification that the order including the first product and the second product is complete is displayed at a third user device.

16 Claims, 8 Drawing Sheets

(58) Field of Classification Search
USPC .................................................... 705/26.81
See application file for complete search history.

(56) References Cited

U.S. PATENT DOCUMENTS

| | | | |
|---|---|---|---|
| D803,861 S | 11/2017 | Graham et al. | |
| D837,814 S | 1/2019 | Lamperti et al. | |
| D845,323 S | 4/2019 | Clediere et al. | |
| D855,635 S | 8/2019 | Prag et al. | |
| D879,816 S | 3/2020 | Hodgson et al. | |
| D881,915 S | 4/2020 | Reid et al. | |
| D902,224 S | 11/2020 | Felkins et al. | |
| D913,309 S | 3/2021 | Zhao et al. | |
| 10,943,311 B1 | 3/2021 | Svenson et al. | |
| D916,800 S | 4/2021 | Westerhold et al. | |
| D977,502 S | 2/2023 | Lu et al. | |
| D979,586 S | 2/2023 | Song | |
| D980,856 S | 3/2023 | Hsu et al. | |
| D992,567 S | 7/2023 | Gao et al. | |
| D1,001,833 S | 10/2023 | Carrigan et al. | |
| 11,880,804 B1* | 1/2024 | Sleeman ............... | G06Q 10/087 |
| D1,023,031 S | 4/2024 | Khoreibi et al. | |
| D1,027,995 S | 5/2024 | Ponnusamy et al. | |
| D1,035,682 S | 7/2024 | Qiu | |
| 2007/0187183 A1 | 8/2007 | Saigh et al. | |
| 2012/0253971 A1 | 10/2012 | Bansal et al. | |
| 2016/0078523 A1 | 3/2016 | Lopez et al. | |
| 2016/0140632 A1* | 5/2016 | Kandala ............ | G06Q 30/0603 |
| | | | 705/26.61 |
| 2018/0134492 A1 | 5/2018 | Lert | |
| 2019/0228463 A1 | 7/2019 | Chan et al. | |
| 2019/0303911 A1 | 10/2019 | Goodwin | |
| 2020/0320613 A1* | 10/2020 | Broca .............. | G06Q 10/06316 |
| 2021/0224882 A1 | 7/2021 | Wheeler et al. | |
| 2021/0248530 A1* | 8/2021 | Garcia-Brosa ... | G06Q 10/06315 |
| 2022/0004985 A1* | 1/2022 | Neumann .......... | G01C 21/3492 |
| 2022/0036898 A1* | 2/2022 | Siefken ................. | G06V 20/00 |
| 2022/0237530 A1* | 7/2022 | Franey ................ | G06Q 10/047 |

FOREIGN PATENT DOCUMENTS

| | | |
|---|---|---|
| CN | 306870999 | 10/2021 |
| CN | 307142176 | 3/2022 |

OTHER PUBLICATIONS

Happy Tri Miliarta, "Delivery Mobile App Design", www.dribble.com, retrieved online Jul. 23, 2024, posted online Nov. 20, 2022, https://dribble.com/shots/19943164-Delivery-Mobile-App-Design, 2 pages.

Instacart, "Instacart Unveils a More Affordable Way to Shop Online With New Features That Help Consumers Save on Groceries," www.instacart.com, retrieved online Jul. 23, 2024, posted online Dec. 16, 2021, https://web.archive.org/web/20211216195702/https://www.instacart.com/company/pressreleases/instacart-unveils-a-more-affordable-way-to-shop-online-with-new-features-that-help-consumers-save-on-groceries/, 1 page.

Target, "Fast and Free: All the Facts on Returns with Drive Up", www.corporate.target.com, retrieved online Jul. 23, 2024, posted online Jun. 26, 2023, https://corporate.target.com/press/fact-sheet/2023/04/fast-and-free-all-the-facts-on-returns-with-drive-up, 2 pages.

Target, "Food Order Pickup App—Checkout", www.dribble.com, retrieved online Jul. 23, 2024, posted online Jan. 20, 2021, https://dribble.com/shots/14967934-Food-order-pickup-app-Checkout, 2 pages.

* cited by examiner

ORDER ASSEMBLY METHODS AND SYSTEM FOR MULTIPLE POINTS OF SALE

RELATED APPLICATIONS

This application is related to U.S. Design patent application Ser. No. 29/882,382, filed Jan. 13, 2023, and entitled "DISPLAY SCREEN WITH GRAPHICAL USER INTERFACE," which is incorporated by reference herein for all purposes.

BACKGROUND

Retail customers increasingly utilize retailer applications, websites, delivery applications, and the like to place advanced orders (e.g., for delivery or customer pick-up) from various retailers. Customers may wish to place a single order for retail locations which are co-located (e.g., as a store-within-a-store) or located closely to one another. However, coordinating between separate retailers to fulfill such orders is often difficult, especially where made to order products, such as food products, are included in such orders.

SUMMARY

An example computer implemented method includes displaying, at a first user device and a second user device, information about an order including a first product and a second product, where the first product originates at a first retailer and the second product originates at a second retailer. A first user input corresponding to an initiation of production of the first product is received from the first user device and a first visual status reflecting the initiation is displayed at the second user device. A second user input corresponding to a completion of the production of the first product is received from the first user devices and the first visual status is updated to a second visual status reflecting the completion at the second user device. A third user input corresponding to an assembly of the order is received from the second user device and a notification that the order including the first product and the second product is complete is displayed at a third user device.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1:
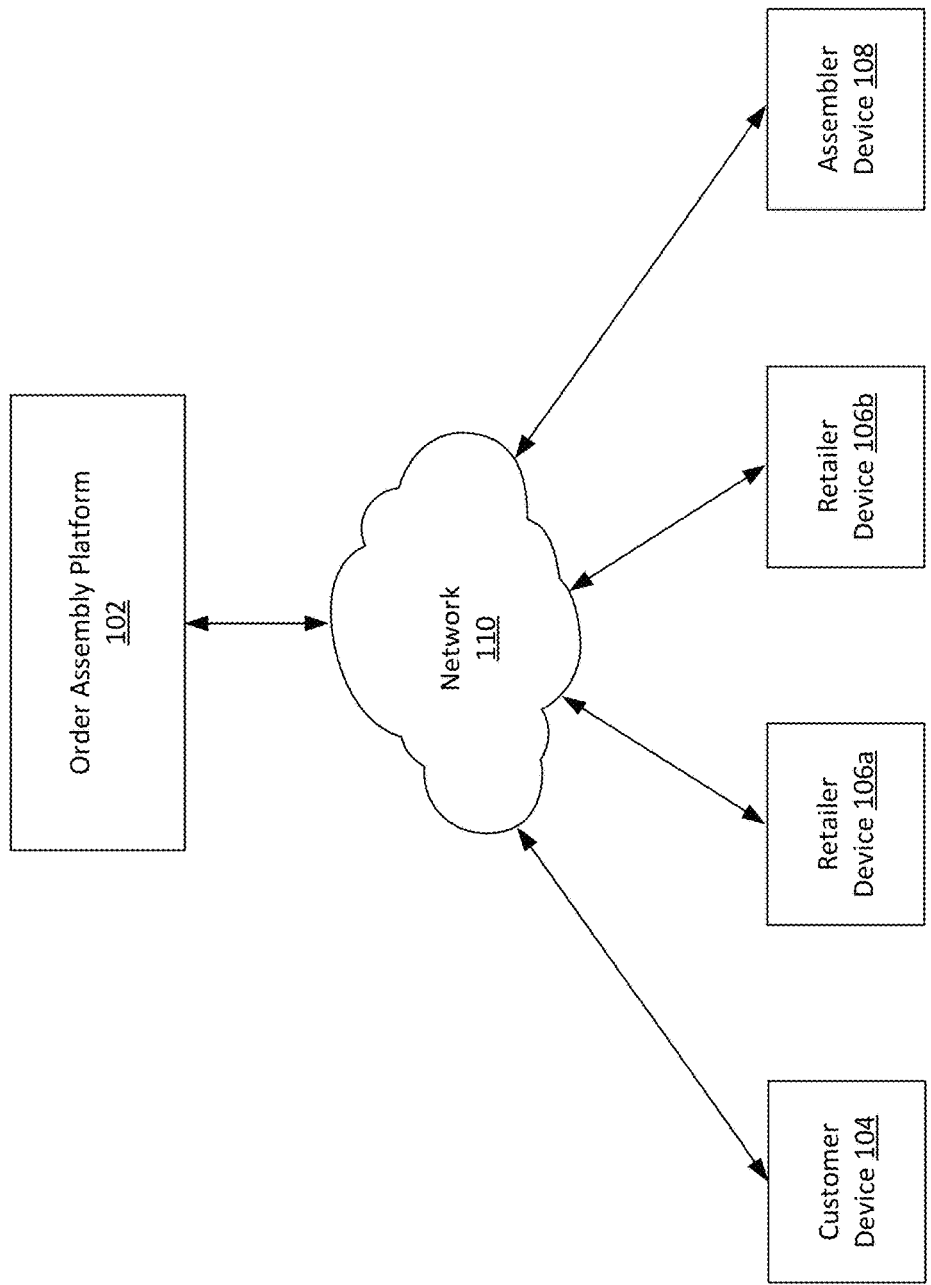
FIG. 1 illustrates an example system including user devices in communication with an order assembly platform, in accordance with various examples described herein.

Pre-order of products is increasingly common. For example, customers often place online orders for delivery, drive-up fulfillment, pick up at a retail location, and the like. A large portion of such orders may be placed at department stores or other retailers including a wide variety of products. For example, such retailers may sell products having different handling or storage requirements (e.g., temperature holding requirements, handling with extra care for delicate products, and the like). Further, such retailers may frequently provide retail space to smaller retailers, in the form of a store-within-a-store. Including smaller retailers in the same location as the larger retail may provide an improved customer experience, as the customer may be able to purchase more items in one place. The ability to place an order (e.g., for pickup or delivery) from both a large retailer and a smaller retailer sharing space with the large retailer may further benefit customers and provide an improved experience. However, such retailers may add additional products having different handling, storage, or preparation requirements (e.g., a coffee shop making hot beverages to order), and may operate using different technological infrastructure (e.g., point of sale software, inventory software, ordering systems, and the like) than the larger store. Customers placing orders through various applications, via the Internet, and the like may further wish to view progress of such orders in real-time, even where orders include products obtained from multiple retailers.

The order assembly platform disclosed herein facilitates a more efficient ordering and order fulfillment process for orders including items from multiple retailers, items made to order, and/or items having special or different holding or handling requirements. For example, by providing an interface to technological systems utilized by different retailers or departments, units or entities within the same retailer, a customer may order from multiple retailers using a single interface with a single point of payment. Such a single point of payment may further reduce processing and computing resources utilized to place such an order, as the customer may place the order through one interface rather than placing separate orders through separate platforms and/or applications. An assembler (e.g., person responsible for assembling all ordered products into the final order) may further be provided with an interface to monitor progress of preparation of different products within the order, even where such products are obtained from different retailers. Accordingly, the assembler may time assembly of an order based on preparation stages of various products within the order, reducing instances where items are assembled too early, which can lead to having to discard items which have, for example, been left at room temperature for too long (e.g., exceeding a time allowed by various regulations or quality control procedures). Though described with respect to a store-within-a-store or different departments of a single retailer, the order assembly platform described herein may be used to assemble orders from retailers having distinct physical locations including, for example, restaurants, grocery stores, specialty retailers, and the like. Similarly, the order assembly platform may be used within a single retailer. For example, the user interface provided by the order assembly platform may be utilized to monitor order progress at the retailer. The order assembly platform may further provide interfaces for customers placing orders at various retailers, including via an application, the internet, and the like, which provide information to such customers about progress of orders. Similarly, where a customer places an order from multiple retailers, customers may view progress and be notified when orders obtained from different retailers or departments of a retailer are available for pickup.

Various embodiments of the present disclosure will be explained below in detail with reference to the accompanying drawings. Other embodiments may be utilized, and structural, logical and electrical changes may be made without departing from the scope of the present disclosure. Turning now to the drawings, FIG. 1 illustrates an example system including user devices in communication with an order assembly platform 102, where the order assembly platform 102 is used to facilitate ordering of products from multiple retailers and efficient assembly of such orders. For example, a customer device 104 may be utilized to place an order with products from multiple retailers. Retailer devices 106a and/or 106b may be utilized to receive orders, update status of products in such orders, and the like. Assembler device 108 may communicate with the order assembly platform 102 to monitor status of products in an order from multiple retailers, view products that are part of an order for assembly, and the like. In some examples, one or more of the customer device 104, the retailer device 106a, the retailer device 106b, and the assembler device 108 may communicate directly with the order assembly platform 102 via a network 102. In some examples, such devices may communicate with other systems, such as systems, servers, and/or applications associated with a retailer, an ordering platform, or the like, where the other systems may interface or communicate directly with the order assembly platform 102.

The order assembly platform 102 may generally be used to coordinate the placement, assembly, delivery, and/or pick-up of orders including products from multiple retailers. In some examples, the order assembly platform 102 may be part of an application, server, or other infrastructure of a retailer, delivery service, or the like. For example, a physical location of a large retailer (e.g., a department store) may host a location of another retailer (e.g., a store-within-a-store), and the order assembly platform 102 may be part of an application or infrastructure of the large retailer. In some examples, a delivery service may assemble orders from multiple retailers on behalf of customers, and the order assembly platform 102 may be part of an application or server associated with the delivery service.

To facilitate such orders, the order assembly platform 102 may provide coordination between retailer systems, customers, and assemblers. For example, the order assembly platform 102 may coordinate between retailer systems to provide a single point of payment for a customer placing an order at the multiple retailers. The order assembly platform 102 may further notify retailers when products are ordered from the retailers as part of a larger order. The order assembly platform 102 may also provide tracking of various products of these larger orders, allowing an assembler (e.g., an individual responsible for collecting products for the larger order) to monitor progress of preparation for products which are made to order, monitor progress of picking items for a portion of the order, and the like. Accordingly, the order assembly platform 102 provides improved efficiency and product quality for such orders by providing a more streamlined ordering experience for customers and providing information to assemblers allowing the assemblers to efficiently time order assembly and delivery.

In various examples, different retailers coordinated by the order assembly platform 102 may be retailers sharing space (e.g., a store-within-a-store and a larger department store providing space to the store-within-a-store), located in close proximity to one another (e.g., within the same shopping center), sharing a warehouse or shipping facility, or in separate physical locations. Such retailers may have separate information technology infrastructure (e.g., point of sale systems, inventory systems, consumer facing applications, order fulfillment applications, and the like), and may be otherwise operationally separate. For example, a customer purchasing products from separate retailers in person may check out at different points of sale for different retailers.

In various examples, the order assembly platform 102 may further coordinate within one retail location to monitor preparation of products from different departments or sections of the retailer. In some examples, sections or departments may provide different types of products, such as a deli, floral section, fresh food section, frozen food section, clothing section, electronics section, and the like. In some examples, such sections may be determined based on holding, transportation, or other requirements of the products provided by the section. For example, a section may include clothing, shelf-stable food, home accessories, and other products without special holding or handling requirements. A section may further include all products having temperature hold requirements (e.g., frozen or fresh food), having similar purchase restrictions (e.g., age based purchase restrictions), and the like.

In various examples, production or preparation of products (e.g., made to order products) may be monitored or tracked using the order assembly platform 102. For example, preparation of products may include making food and beverage products, assembling custom orders (e.g., floral orders, deli orders, and the like), filling prescriptions, picking orders, assembling purchased items (e.g., furniture, bicycles, sporting equipment), and other such actions. By tracking production, an assembler may coordinate when different portions of an order should be picked up for final assembly of the order. For example, by tracking production of a hot beverage, an assembler may delay picking up refrigerated products of an order until the hot beverage is ready or close to being ready. Accordingly, the assembler may avoid picking up the refrigerated items too early (which may cause such refrigerated items to be undeliverable due to being held too long at non-refrigerated temperatures) and/or picking up the hot beverage too long after completion (which may lead to the beverage being undeliverable due to too much time elapsing between completion and delivery). In addition to avoiding such waste of products, such coordination may allow for higher quality (e.g., fresher) items to be provided to consumers.

The order assembly platform 102 may generally be implemented by or at a computing device or combinations of computing resources in various embodiments. In various examples, the order assembly platform 102 may be implemented by one or more servers, cloud computing resources, and/or other computing devices. The order assembly platform 102 may, for example, utilize various processing resources to facilitate placement and assembly of orders including products from multiple retailers, and the like. The order assembly platform 102 may further include memory and/or storage locations to store program instructions for execution by the processor and various data utilized by the order assembly platform 102. The order assembly platform 102 may be or include a mobile application, a website presented through a web browser (e.g., at a tablet, laptop, or desktop computer), and the like.

Generally the customer device 104, retailer device 106a, retailer device 106b, and/or the assembler device 108 may be devices belonging to an end user, such as a consumer, retailer, assembler, or other entities or users accessing the order assembly platform 102. For example, customer device 104 may be a device belonging to a customer placing an order facilitated by the order assembly platform 102. Generally, the customer device 104 may connect to the order assembly platform 102 either directly or via another application or platform, such as an application associated with a particular retailer, delivery service, or the like. Retailer devices 106a and 106b may be, for example, point of sale devices, tablets, or other devices provided to employees at retailers accessing the order assembly platform 102. In some examples, such devices may be provided to workers at a location where products are produced for orders, to facilitate updating product production information for use by the order assembly platform 102. The assembler device 108 may be a similar device and may be utilized by someone with responsibility for assembling orders including products from multiple retailers (e.g., an assembler). In various examples, the assembler may be associated with a retailer, a delivery or fulfillment service, or other entity responsible for assembling such orders.

In various implementations, the customer device 104, retailer device 106a, retailer device 106b, the assembler device 108, and/or additional user devices may be implemented using any number of computing devices including, but not limited to, a computer, a laptop, mobile phone, smart phone, wearable device (e.g., AR/VR headset, smart watch, smart glasses, or the like), smart speaker, vehicle (e.g., automobile), or appliance. Generally, such devices may include one or more processors, such as a central processing unit (CPU) and/or graphics processing unit (GPU). Such devices may generally perform operations by executing executable instructions (e.g., software) using the processor(s). Though four end user devices are shown in FIG. 1, any number of user devices, including customer devices, retailer devices, assembler devices, and the like, may be in communication with the order assembly platform 102, in various examples.

The network 110 may be implemented using one or more of various systems and protocols for communications between computing devices. In various embodiments, the network 110 or various portions of the network 110 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

Various devices accessing the order assembly platform 102 may communicate with the order assembly platform 102 and/or other devices using different types of networks. For example, retailer devices 106a and 106b and the assembler device 108 (e.g., devices located at a common physical retail location) may communicate with one another and/or with the order assembly platform through a LAN, which may be a secured network provided and secured by the retailer. Customer devices (e.g., customer device 104) may communicate with the order assembly platform 102 using the Internet, cellular networks, and the like. Any combination of network types may be utilized by different devices in various examples.

Though not shown in FIG. 1, the order assembly platform 102 may be in communication with other systems or components. For example, the order assembly platform 102 may communicate with retailer systems, payment services, authentication services, and the like.

Figure 2:
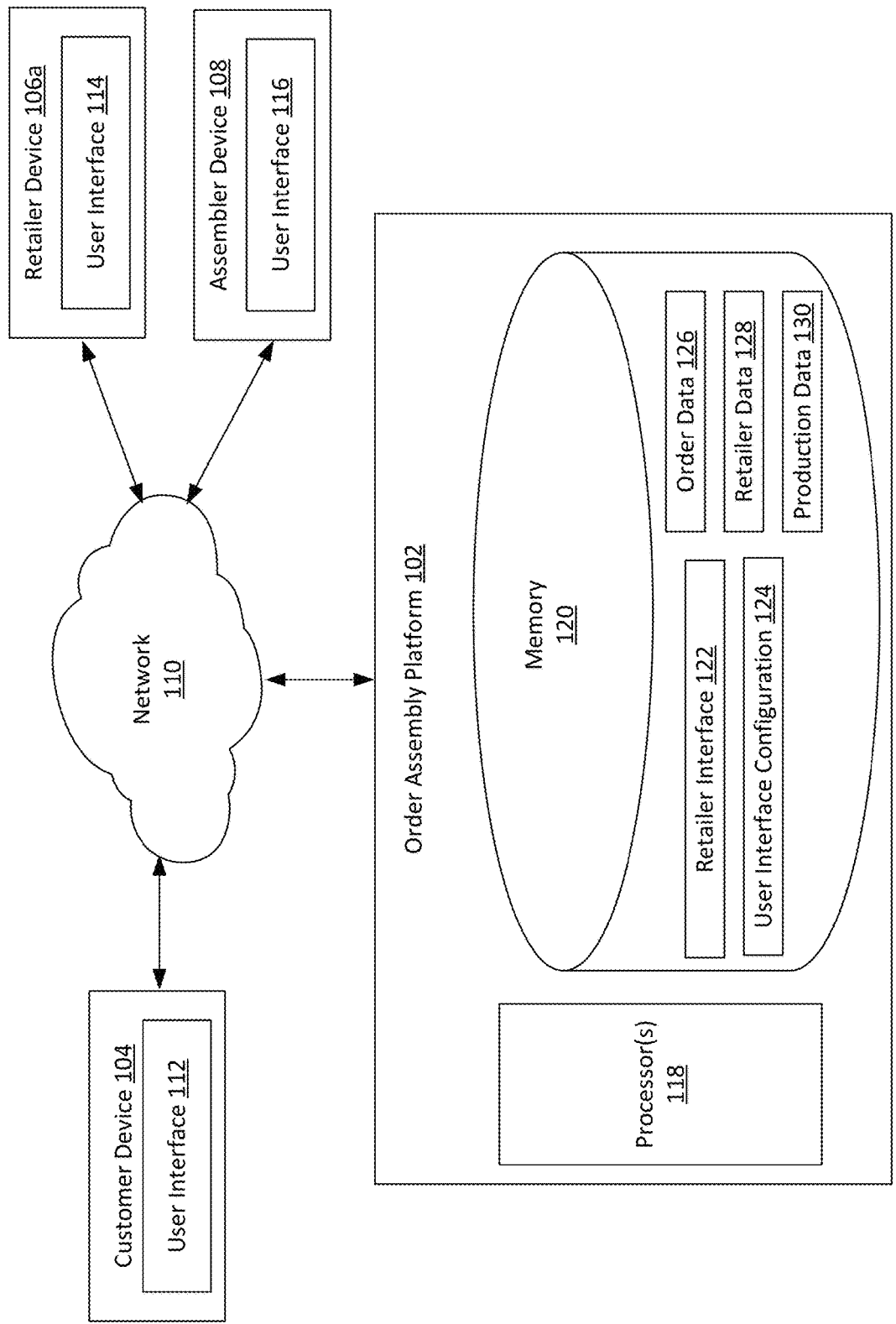
FIG. 2 illustrates a schematic diagram of an example order assembly platform, in accordance with various examples described herein.

FIG. 2 illustrates a schematic diagram of an example order assembly platform 102 and devices in communication with the order assembly platform 102. The order assembly platform 102 may generally coordinate between such devices (and/or other platforms utilized by such devices) to facilitate ordering and fulfillment of orders including products from multiple retailers. Such orders may include items which are made to order, and the order assembly platform 102 may provide interfaces allowing for tracking of such product production across retailers.

In various implementations, the order assembly platform 102 may include or utilize one or more hosts or combinations of compute resources, which may be located, for example, at one or more servers, cloud computing platforms, computing clusters, and the like. Generally, the order assembly platform 102 is implemented by compute resources including hardware for memory 120 and one or more processors 118. For example, the retail application 102 may utilize or include one or more processors, such as a CPU, GPU, and/or programmable or configurable logic. In some embodiments, various components of the order assembly platform 102 may be distributed across various computing resources, such that components of the order assembly platform 102 may communicate with one another through the network 110 or using other communications protocols. For example, in some embodiments, the order assembly platform 102 may be implemented as a serverless service, where computing resources for various components of the order assembly platform 102 may be located across various computing environments (e.g. cloud platforms) and may be reallocated dynamically and/or automatically according to, for example, resource usage of the order assembly platform 102. In various implementations, the order assembly platform 102 may be implemented using organizational processing constructs such as functions implemented by worker elements allocated with compute resources, containers, virtual machines, and the like.

The memory 120 may include instructions for various functions of the order assembly platform 102 which, when executed by processor 118, perform various functions of the order assembly platform 102. The memory 120 may further store data and/or instructions for retrieving data used by the order assembly platform 102. Similar to the processor 118, memory resources utilized by the order assembly platform 102 may be distributed across various physical computing devices. In some examples, memory 120 may access instructions and/or data from other devices or location, and such instructions and/or data may be read into memory 118 to implement the order assembly platform 102.

The memory 118 may include or access various types of data used by the order assembly platform 102. While such data is shown in FIG. 2 as being stored at a memory 118, in some examples, data may be stored at other memory resources of the order assembly platform 102 and/or at locations remote from the order assembly platform 102, such as various databases or datastores. In such examples, the memory 118 of the order assembly platform 102 may include instructions for accessing such data from remote locations, including, for example, the locations of the data and/or specific queries used to retrieve data for use by the order assembly platform 102. Such data may include order data 126, retailer data 128, and/or production data 130, in various examples.

Order data 126 may include, in various examples, information about products or items within an order. For example, order data 126 may include identifiers for all products included in an order placed by a customer (e.g., through a user interface 112 of the customer device 104). Order data 126 may further include, for various products in the order, identification of retailers providing the product, whether the product is made to order, any specialized holding and/or handling information relevant to the product, a department or section of a retailer from which the product originates, and the like. In various examples, order data 126 may also include, for each product in the order, any additional instructions or requests provided by a customer when placing an order, such as ingredient changes or requests, size requests, and the like. Order data 126 may further include information applicable to the order as a whole, such as an identifier associated with a customer placing and picking up the order, a delivery method for the order (e.g., customer pickup location, delivery location, identifier of fulfillment or courier service completing delivery, and the like), timing of the order (e.g., estimated customer pickup time), and the like.

Retailer data 128 may include information about various retailers in communication with and/or utilizing the order assembly platform 102. For example, retailer data 128 may include information about products offered for sale by such retailers, information technology platforms utilized by such retailers (including, in some examples, information for interfacing with such platforms), location of the retailer, availability of the retailer to fulfill additional orders, operating times of the retailer, and the like. In various examples, retailer data 128 may be updated dynamically. For example, retailer data 128 may include items available for purchase from the retailer. Such item listings may update to reflect updated stock of the items and/or ingredients used to make the items. In another example, a retailer may have a specific order capacity (e.g., ten customer orders in an hour), and availability of the retailer to fulfill new orders may update when such capacity is reached.

Production data 130 may include production status information for various items within an order. Accordingly, the order assembly platform 102 may dynamically update such production data as the order assembly platform 102 receives information or inputs related to various production events, such as initiating production for one or more products in an order, completion of production of one or more products in an order, cancellation of production of products in an order, and the like.

The memory 120 may further include instructions for user interface configuration 124. Such instructions for user interface configuration 124 may, when executed by the processor 118, generate user interfaces of the order assembly platform 102 (e.g., user interfaces presented to consumers, retailers, assemblers, and other users), communicate with various user devices (e.g., customer device 104, retailer device 106a, retailer device 106b, and/or assembler device 108) to display such user interfaces, and receive information provided to the order assembly platform 102 via such user interfaces. User interface configuration 124 may further communication with other components of the order assembly platform 102 to generate such user interfaces and/or to provide information or data collected through such user interfaces.

In various examples, the memory 120 may include instructions for order configuration 122. Instructions for order configuration 122 may, when executed by the processor 118, update order data 126, retailer data 128, and/or production data 130 responsive to input provided to the order assembly platform 102 to coordinate and facilitate ordering and order fulfillment for orders including products originating from multiple retailers. Order configuration 122 may generally receive information from, and provide information to, user interface configuration 124. For example, order configuration 122 may receive information about a new order placed by a customer via a user interface 112 at a customer device 104. Order configuration 122 may, based on such information, update order data 126 to create a new object or entry corresponding to the order and including information such as originating retailers, products included in the order, customer information, delivery method, estimated delivery or pickup time, and the like.

Order configuration 122 may further utilize retailer data 128 and order data 126 to determine, for each product in an order, an associated retailer. Order configuration 122 may further, in some examples, group products in the order based on other common characteristics, such as department of origin within a retailer, made to order status, special holding or handling requirements, and the like. When a new order is placed, order configuration 122 may further update production data 130 by creating a new entry or object associated with the order used to track production of various products in the order. As the order assembly platform 102 receives information or inputs indicating that production for various products has begun or progressed (e.g., via a user interface 114 at a retailer device 106a), order configuration 122 may update such production data 130 to reflect a current production status of the order.

User interface configuration 124 may utilize such production data 130, retailer data 128, and/or order data 126 when configuring and displaying various user interfaces described herein. For example, user interface configuration 124 may access order data 126 to determine what status indicators to display with respect to a particular order, and may access production data 130 to determine what visual status such status indicators should display (e.g., whether the indicators should reflect that production of a product is in progress, complete, not started, etc.). User interface configuration 124 may further access retailer data 128 to communicate with retailer devices 106a and 106b.

The components shown in FIG. 2 are exemplary only. In various examples, the order assembly platform 102 may communicate with and/or include additional components and/or functionality not shown in FIG. 2. For example, the order assembly platform 102 may include separate components for tracking deliver of orders assembled using the order assembly platform 102. In some examples, the order assembly platform 102 may include additional components for authentication to, for example, authenticate assembler users before providing such users with customer data and/or data about pending orders. Similarly, retail users may be authenticated before being provided with access to the order assembly platform 102. In some examples, such authentication may be provided through allowing various users to log into the order assembly platform 102 using accounts associated with such users.

Figure 3:
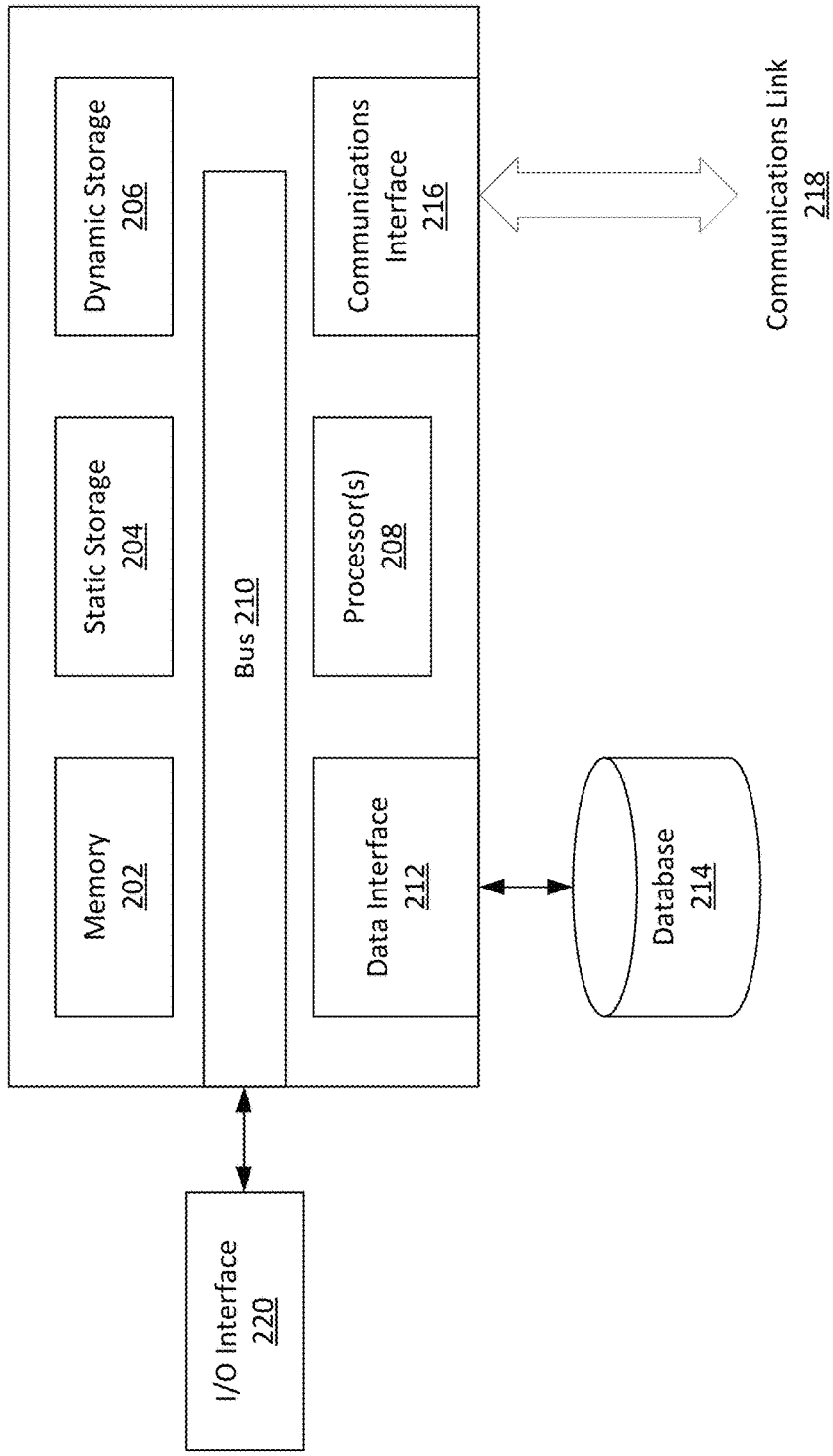
FIG. 3 is a schematic diagram of an example computer system implementing various embodiments in the examples described herein.

Turning to FIG. 3, an example computing system 200 may be used for implementing various embodiments in the examples described herein. For example, processor 118 and memory 120 may be located at one or several computing systems 200. In various embodiments, customer device 104, retailer device 106a, retailer device 106b, and/or assembler device 108 are also implemented by a computing system 200. The order assembly platform 102 may also be implemented by one or several computing systems 200. This disclosure contemplates any suitable number of computing systems 200. For example, the a computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for the retailer interface 122 and/or user interface configuration 124 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, order data 126, retailer data 128, and/or production data 130 may each be stored using a database 214. In various examples, communications link 218 may communicate with, for example, user devices to display user interfaces to the order assembly platform 102.

Figure 4:
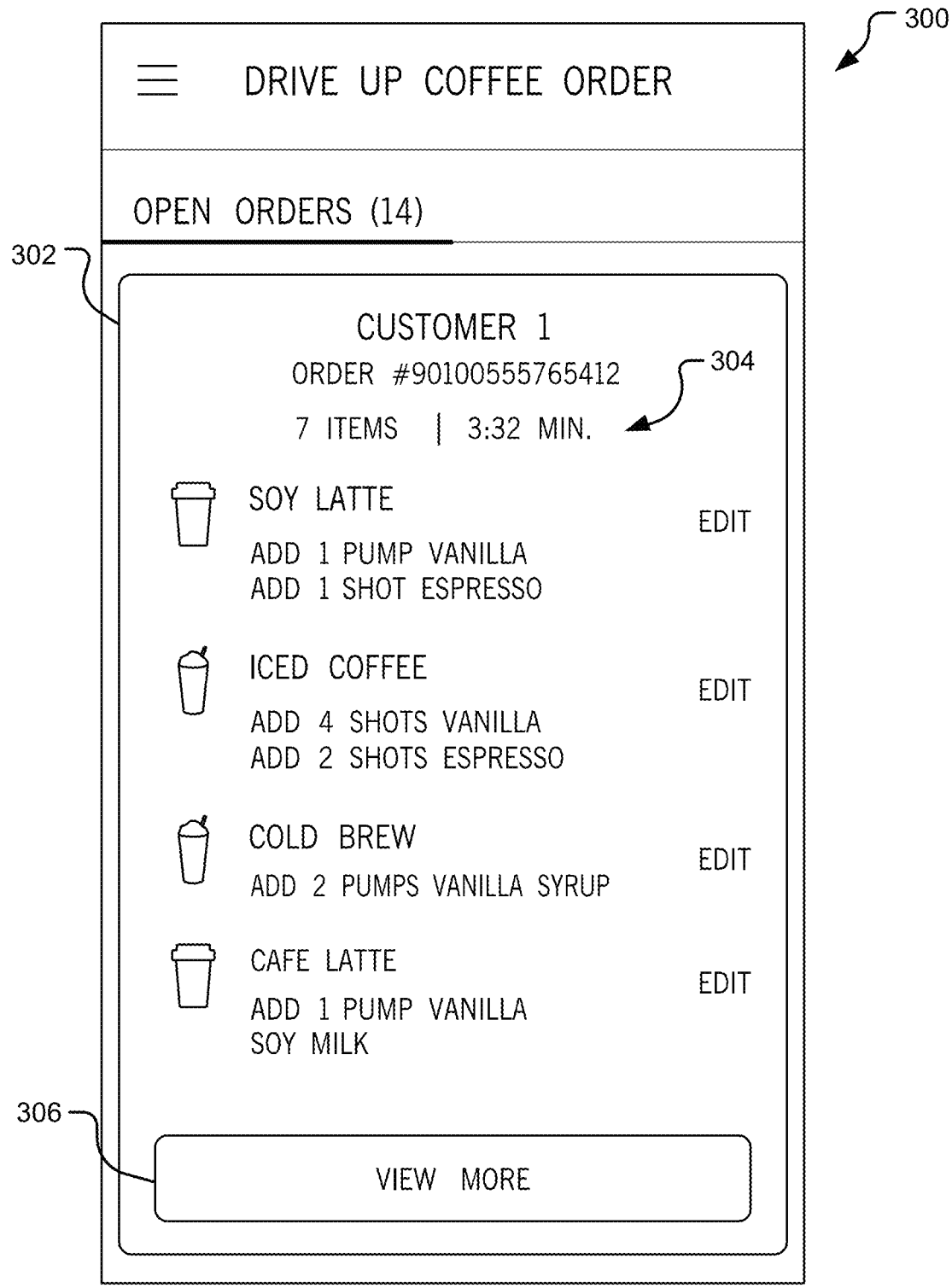
FIG. 4 shows an example user interface of the order assembly platform, in accordance with various examples described herein.

FIG. 4 illustrates an example user interface 300 of the order assembly platform, in accordance with various examples described herein. The user interface 300 may be presented via a user device (e.g., a retailer device 106a and/or 106b) responsive to an order being placed via the order assembly platform 102 by a customer (e.g., using a customer device 104). The user device displaying the user interface 300 may generally be associated with a person responsible for preparing a portion of the customer order including items from a particular retailer. Accordingly, the user interface 300 may display items included in the portion of the order associated with the particular retailer. The person responsible for preparing the portion of the order displayed in the user interface 300 may be, in various examples, an employee of the retailer, an independent contractor associated with or employee of a shopping or other third party service, or the like. In some examples, the portion of the customer order displayed at the user interface 300 may include items associated with a particular department of a retailer, rather than all items ordered from the retailer.

The user interface 300 generally includes a number of open orders and, for each open order, a summary (e.g., order summary 302) showing at least the items in the portion of the order to be prepared by a particular user. In various examples, the user interface 300 may be configurable to provide order summaries for each of the orders included in the open orders number provided in the user interface 300. For example, additional order summaries may be viewed by scrolling or swiping on a touch screen device.

The order summary 302 includes at least a listing of items of a portion of a customer order to be prepared by the user accessing (e.g., viewing) the user interface. In the example of the user interface 300, the customer order may include items from a large retailer and from a coffee shop located within the retailer (e.g., as a store-within-a-store). The user accessing the user interface may, accordingly, be a barista responsible for preparing the items in the order. In some examples, the user interface 300 may be accessed simultaneously by more than one barista, and each barista may prepare one or more of the items displayed in the order summary 302. The order summary 302 may, in various examples, include a timing element 304, which may show, for example, an amount of time remaining until the customer arrives, until the order portion needs to be prepared, or the like. The order summary 302 may further include an element 306 allowing the user to view more detail about the items in the order. For example, where the portion of the order reflected in the order summary 302 includes more items than can be displayed in the order summary 302, the element 306 may be selectable to view a complete listing of the items. In some examples, the element 306 (or other elements of the user interface 300) may be selectable to provide more detail about individual items, such as customizations, preparation instructions, and the like.

Figure 5B:
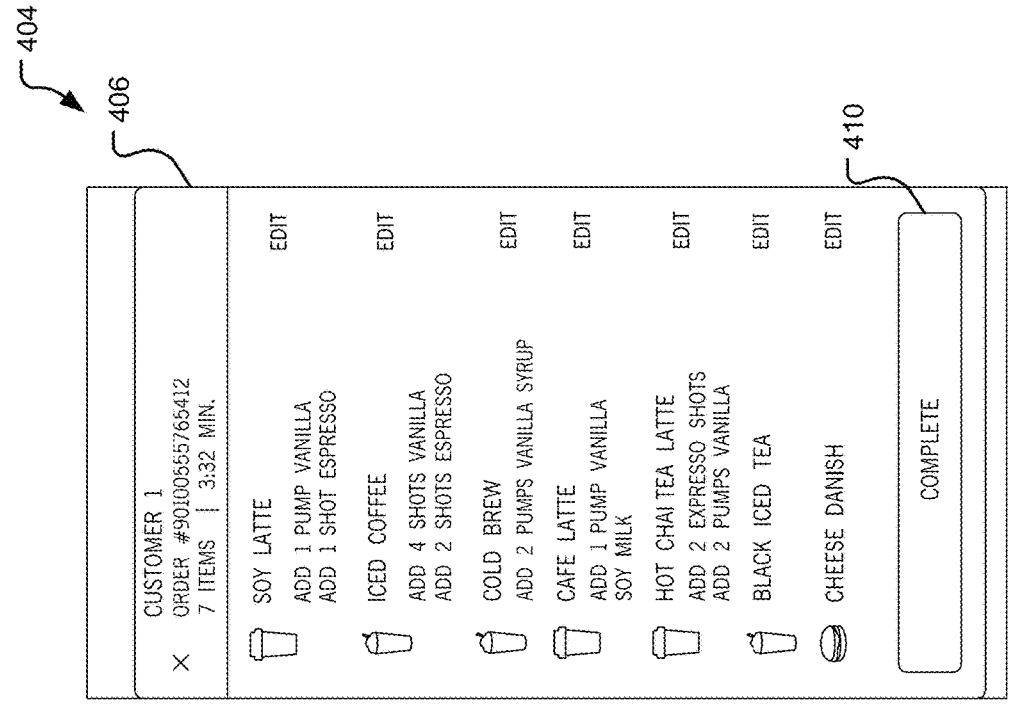
FIG. 5B shows an example user interface of the order assembly platform, in accordance with various examples described herein.
Figure 5A:
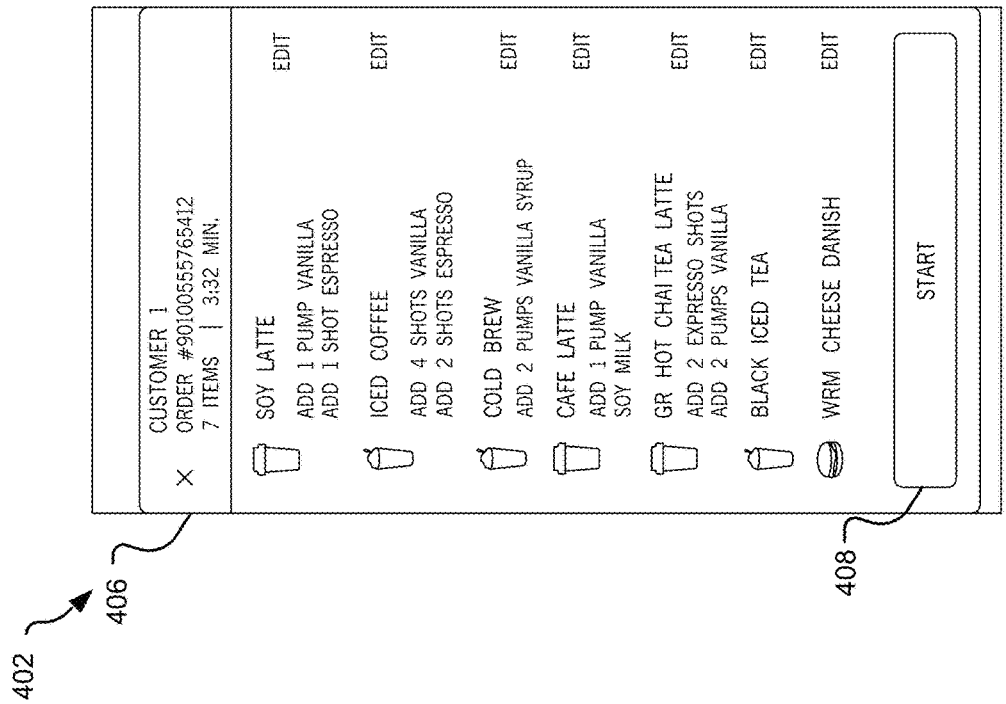
FIG. 5A shows an example user interface of the order assembly platform, in accordance with various examples described herein.

FIG. 5A illustrates an example user interface 402 of the order assembly platform, in accordance with various examples described herein. The user interface 402 may generally be displayed at a user device (e.g., retailer device 106a and/or retailer device 106b) associated with a person assembling a portion of a customer order including items shown in the user interface 402. In various examples, the user interface 402 may be rendered responsive to a user selecting an element of the user interface 300, such as an order summary 302 or other element 306. For example, order detail 406 for the order may be shown responsive to selecting the element 306 in the user interface 300 to view more information about the order.

The order detail 406 may generally include an element 408 which, when selected, indicates that the user has begun preparation of the portion of the customer order including the items shown in the order detail 406. In various examples, selection of the element 408 may update production data 130 and/or other data at the order assembly platform 102 to reflect that preparation of the items has begun. When the element 408 is selected, the user interface 402 may be replaced with the user interface 404 shown in FIG. 5B. The user interface 404 also includes the order detail 406 and an element 410 which, when selected, indicates that the user has completed production of the portion of the customer order including the items shown in the order detail 406. Selection of the element 410 may update production data 130 and/or other data at the order assembly platform 102 to reflect that preparation of the items is complete. The production data 130 may, accordingly, reflect preparation status of the items and may be used to provide visual indicators of progress to other users of the order assembly platform 102, such as through user interfaces at customer devices 104 and/or assembler devices 108.

In some examples, the user interface 402 and/or the user interface 404 may include additional selectable elements which may be used to update status for individual items. For example, user interface 404 may include additional elements which, when selected, indicate that preparation of individual items is completed. Such information may update the production data 130 such that progress indicators shown to other users of the order assembly platform 102 show more granular information regarding order preparation. For example, a status indicator may reflect that an order, or a sub-portion of an order, is a certain percentage complete based on the production data 130 including production status of individual items.

Figure 6:
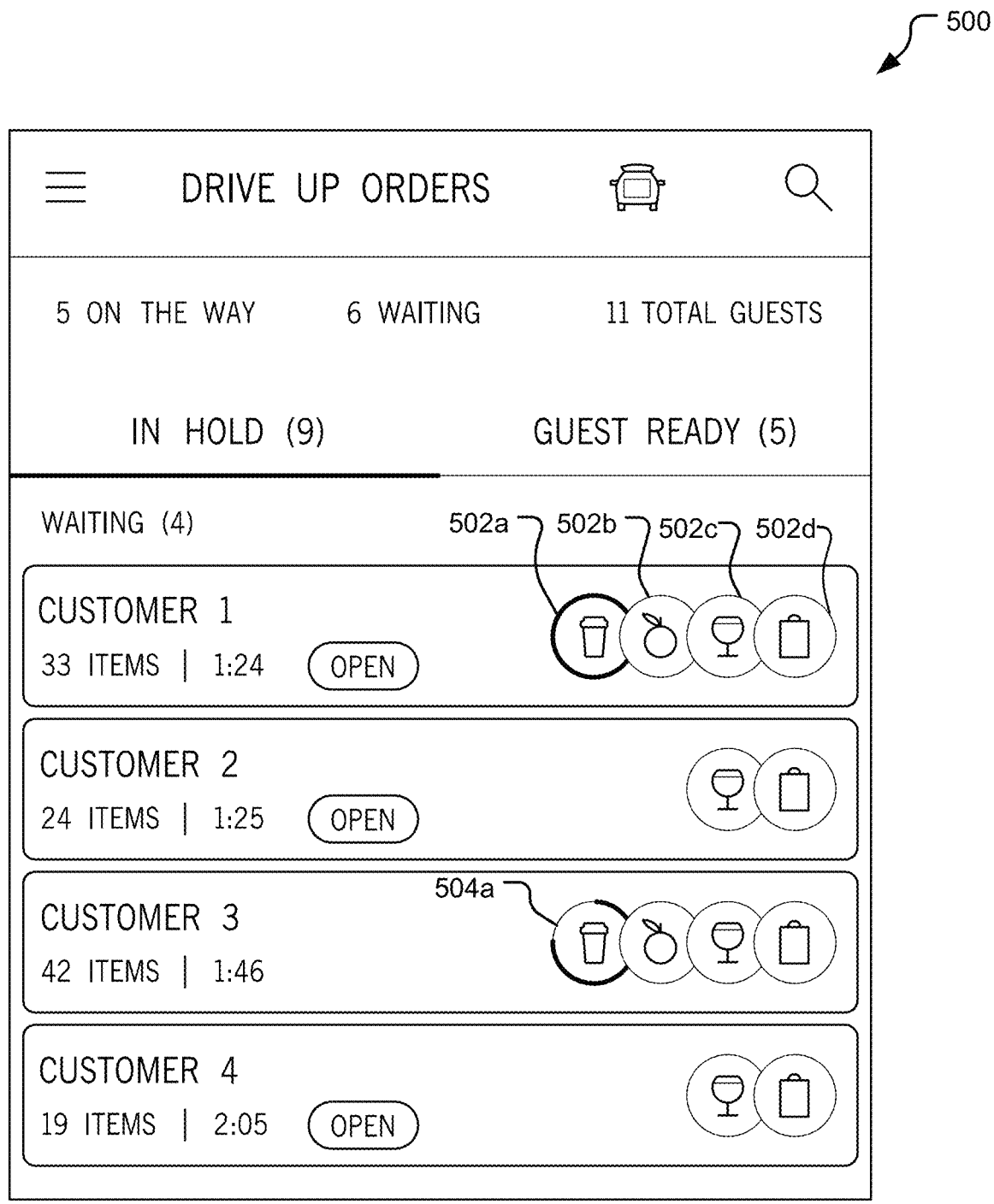
FIG. 6 shows an example user interface of the order assembly platform, in accordance with various examples described herein.

FIG. 6 illustrates an example user interface 500 of the order assembly platform 102. The user interface 500 may be displayed at, for example, a user interface 116 of an assembler device 108. In various examples, similar or other user interfaces may be configured by the order assembly platform 102 for display at other devices accessing the order assembly platform 102, such as the customer device 104, the retailer device 106a, and/or the retailer device 106b.

The user interface 500 may generally allow a user associated with the assembler device 108 (e.g., an assembler) to view progress of multiple products or items in a single order, where various products within the order are obtained from different retailers. For example, where a product needs to be prepared by a retailer before the order is assembled, the assembler may monitor the progress of such preparation. Accordingly, the assembler may coordinate between the different retailers, improve timing of order assembly, and the like. For example, where an order includes a hot beverage (e.g., a latte) that needs to be prepared before the order is assembled, the assembler may be notified (e.g., via the user interface 500) when the beverage is complete, such that the assembler may retrieve the beverage quickly afterwards. Accordingly, the beverage is less likely to be discarded (e.g., due to temperature holding or food safety rules) and/or to be delivered to the customer cold.

As shown, the user interface 500 generally includes a listing of orders placed via the order assembly platform 102 (or a retailer system or other system in communication with the order assembly platform 102) to be assembled by the assembler. In various examples, such orders may be grouped by status of the customer or guest, such as an estimated arrival time, whether the guest has arrived at a retailer location, a target order preparation time, and the like. In some examples, more urgent orders (e.g., where the customer has already arrived to pick up the order or where the target delivery time has passed) may be shown in a more prominent location in the user interface 500, such as at the top of a list of pending orders. Such tiering of orders may be dynamically updated by changing the display location of indicators associated with an order based on urgency of the orders.

Each order may be displayed with a number of status indicators 502a-502d. Such status indicators may be associated with different retailers, different departments within a large retailer (e.g., a deli order, a bakery order, and the like), and/or a combination of different retailers and different departments of a single retailer. As shown in FIG. 6, such status indicators may include or be displayed with icons indicating the type of product, origin of the product (e.g., retailer or department), and the like. For example, status indicator 502a includes an icon showing a coffee cup, which may indicate the product whose status is reflected by the status indicator 502a originates from a coffee shop which may be, for example, a store within a larger department store or other retailer. Other status indicators may show that other products in the order originate from other retailers or departments within a retailer. For example, status indicator 502b may indicate one or more products in the order originate from a fresh food or produce section or department, status indicator 502c may indicate one or more products in the order originate from an alcoholic beverage section or department, and status indicator 502d may indicate one or more products in the order originate from a shelf stable product section or department. Other departments, retailers, and the like may be included in various examples.

The status indicators may generally provide information to the assembler about the stage of preparation of a product or a group of products. For example, as shown in the user interface 500, progress of the preparation of a product (e.g., the stage of preparation of the product) may be shown through a change (e.g., a change in weight or color of the outline) to the outline of the icon representing the product or group of products. For example, an icon with no outline or a light weight outline may indicate that production of a product has not begun. The outline of the icon may look different depending on the stage of production of the product. For example, the status indicator 504a may show that a product or group of products are in production and production is approximately 75% complete (e.g., approximately 75% of the outline is a heavier weight). The status indicator 502a may show that production of the product or group of products is complete (e.g., all of the outline is a heavier weight). In other examples, different types of status indicators, such as timers, progress bars, and the like may be status indicators and may be used to show the progress of production of a product or grouping of products. In various examples, the status indicators may reflect a stage or percentage of completion of a portion of an order. For example, where a portion of an order prepared by a first retailer includes multiple products, the status indicator may update to reflect completion of individual products of the order.

In various examples, the status indicators may provide such updated visual statuses responsive to actions taken by other entities or users accessing the order assembly platform 102. For example, a barista making a hot beverage may be presented with a user interface (e.g., user interface 402) including an element (e.g., element 406) which the barista selects when production of the beverage has begun. The status indicator may then update to a first visual status showing that production of the beverage (or a larger order including the beverage) has begun. For example, visual indicator 504a provides a status showing that production of one or more products has begun, but is not yet complete. Similarly, upon completion of the beverage or order including the beverage, the barista may select another element (e.g., element 410 in user interface 404) to indicate that the product or products are complete and ready to be assembled in the larger order. For example, status indicator 502a shows a visual status reflecting that production of a product or group of products is complete. Accordingly, the user interface 500 may allow the assembler to track progress of production of various products in an order.

In some examples, different status indicators within the user interface 500 may provide updates responsive to inputs from different retailers, workers, and the like. For example, status indicator 502b may update as a worker for a first retailer picks items in a fresh food order, while status indicator 502a may update as a barista for a second retailer produces a hot beverage for inclusion in the order. In some examples, similar information may be provided to a customer (e.g., displayed at a user interface 112 of the customer device 104) to allow the customer to track the status of an order including items from multiple retailers.

Figure 7:
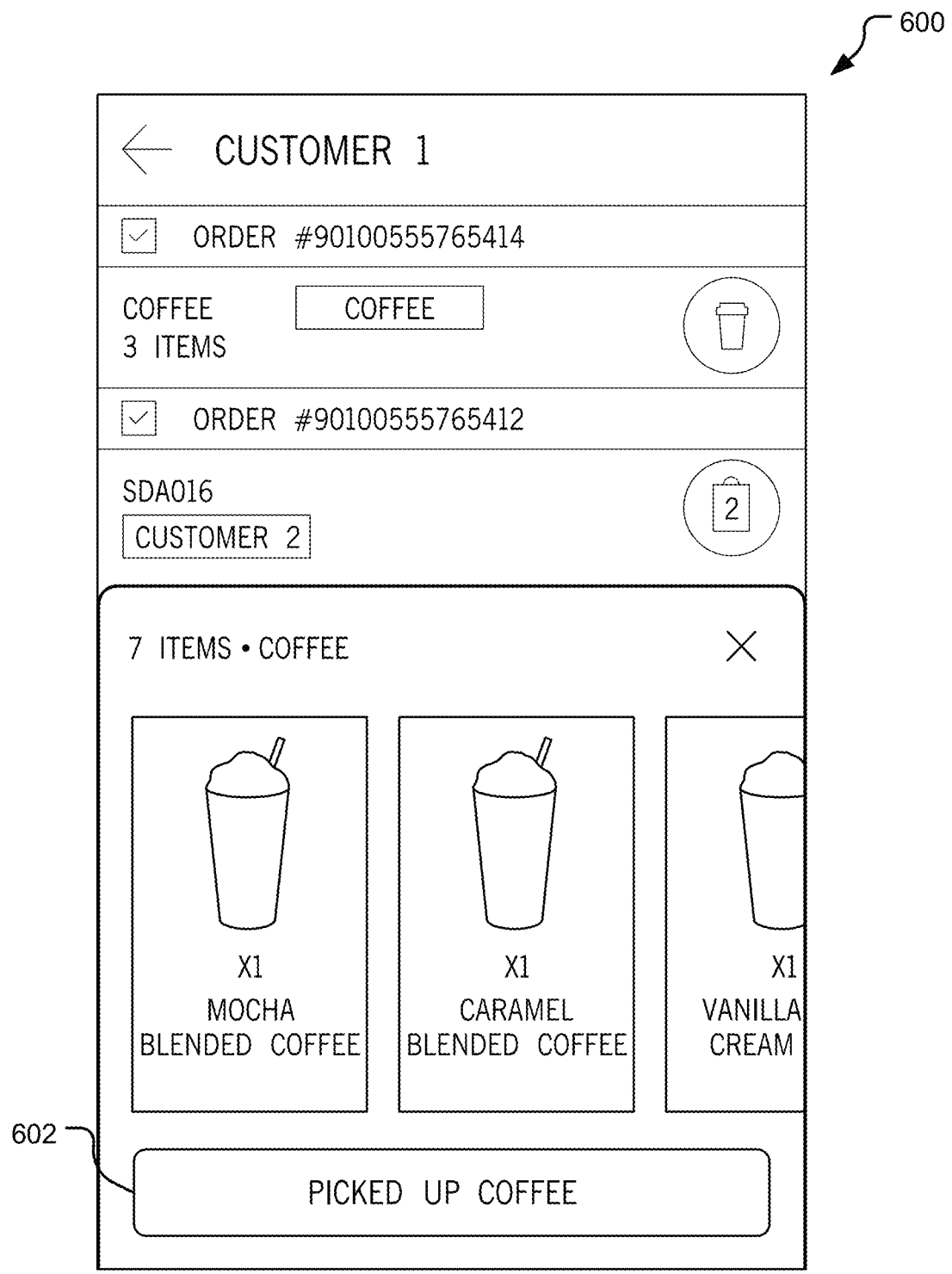
FIG. 7 shows an example user interface of the order assembly platform, in accordance with various examples described herein.

FIG. 7 illustrates a user interface 600 of the order assembly platform 102. The user interface 600 may be displayed at, for example, a user interface 116 of an assembler device 108. The user interface 600 may contain an element 602 which, when selected by the assembler indicates that one or more products of an order have been picked up or otherwise completed for assembly with the remainder of the order. The user interface 600 may include a summary of a portion of the order (e.g., products expected to be included as part of the portion of the order), allowing the assembler to cross-check the provided items with the placed order. In some examples, the assembler may access the user interface 600 after the user interface 500 indicates that a portion of an order is ready for pickup (e.g., through a completed status indicator, such as status indicator 502a). Selection of the element 602 may, in various examples, update order data 126 and/or other data at the order assembly platform 102 to indicate that various products or items in the order have been picked up or assembled as part of the order. In some examples, when all portions of the order have been marked as picked up (e.g., through additional interfaces similar to the user interface 600), other user interfaces provided by the order assembly platform 102 or other systems in communication with the order assembly platform 102 may update. For example, a user interface at a customer device 104 may update to reflect that an order is completed or assembled for pick-up and/or delivery.

Figure 8:
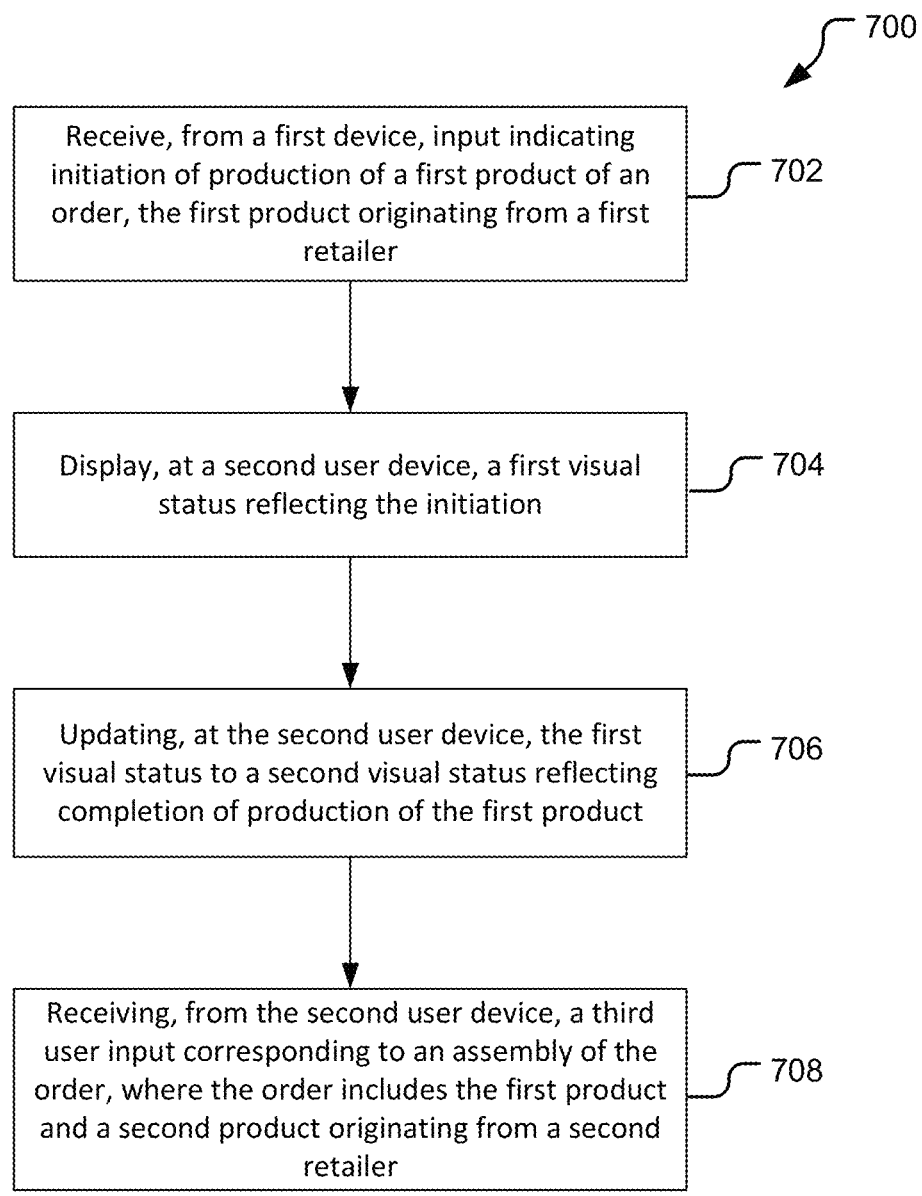
FIG. 8 is a flow diagram of steps for rendering a user interface of an order assembly platform, in accordance with various examples described herein.

FIG. 8 illustrates a process 700 for rendering a user interface of an order assembly platform 102. The user interface rendered by the process 700 may be, for example, similar to the user interface 500 and may be displayed, in various examples, using a user interface 116 of an assembler device 108. In general, the assembler device 108 may be associated with a user responsible for final assembly of an order including items from more than one retailer. The user interface 500 may allow the user associated with the assembler device 108 (e.g., an assembler) to view progress of various items of the order, even where the assembler is not associated with one or more of the retailers providing items in the order.

At block 702, the order assembly platform 102 receives, from a first device, input indicating initiation of production of a first product of an order, where the first product originates from a first retailer. The user interface may be, for example, the user interface 402. For example, the first product may be a hot beverage ordered from a coffee shop located within a department store. The order assembly platform 102 may provide an interface to a barista or other worker producing the hot beverage showing order details (e.g., the specific beverage, size, special requests, approximate pickup time, and the like). The interface may be provided, for example, at a user interface 114 of a retailer device 106a. In various examples, such an interface may include an element (e.g., a button) selectable by the barista to indicate that the barista has started working on the order (e.g., production of the product has been initiated). When the button is selected, the order assembly platform 102 may receive the input indicating that production of the product has been initiated. In various examples, such input may be used to update order data 126 and/or production data 130, to indicate that preparation for the product has been initiated.

In some examples, the first product may be part of a group of products originating from the first retailer. For example, an order may include multiple beverages, pastries, and/or other items ordered from a coffee shop, as shown, for example, in user interface 402. In such examples, a barista may select an element indicating that production of the group of products has begun and/or that production of an individual product in the group of products has begun. Where a barista provides input for each product, a status view may be updated as production for each product begins and is completed.

At block 704, the order assembly platform 102 displays, at a second user device, a first visual status reflecting the initiation. The second user device may be, for example, the assembler device 108. The assembler device 108 may display (e.g., at a user interface 116) an interface to the order assembly platform 102 including status indicators for various products or groups of products included in an order, such as the user interface 500. Such status indicators may provide visual statuses reflecting progress of preparation for the products in an order. For example, the first visual status may show that preparation has been initiated but is not yet complete. For example, status indicator 504a in the user interface 500 shows that production has been initiated for a product or group of products, but such production is not yet complete (e.g., the products are in-progress).

In some examples, the order assembly platform 102 may display, at the second user device, additional status indicators and associated visual statuses for additional products in the order. Such status indicators may be associated with products originating from a different retailer than the first retailer and/or from a separate department or section of the first retailer. The visual statuses of these status indicators may be updated similarly to the updating of the status indicator for the first product (e.g., responsive to input from a separate user device regarding production status of the product).

At block 706, the order assembly platform 102 updates, at the second user device, the first visual status to a second visual status reflecting completion of production of the first product. The second visual status may be displayed using a status indicator at the user interface 500. For example, the status indicator 502a reflects that production of the first product is complete. In various examples, the update at block 706 may be provided responsive to additional input from the first user device indicating that production of the product or group of products is complete.

At block 708, the order assembly platform 102 receives, from the second user device, a third user input corresponding to an assembly of the order, where the order includes the first product and a second product originating from a second retailer. For example, when the assembler device 108 shows that production of the first product is complete, the assembler may then retrieve the first product (and, in some examples, additional products originating from the first retailer) from the first retailer. The assembler may retrieve additional products, including the second product, from other retailers and/or departments within retailers. As the assembler retrieves products from retailers or departments, the assembler may mark corresponding parts of the order as completed or picked up, such as through selection of an element 602 in a user interface 600. In some examples, once all parts of the order are marked as completed or picked up, the second user device may transmit the input to the order assembly platform 102 indicating that the order is assembled.

In some examples, the status indicators may allow the assembler to retrieve various products in the order as close in time as possible, such that products provided to customers in the assembled order are provided in the appropriate condition (e.g., hot beverages are hot, refrigerated or frozen items are cold, etc.). For example, the assembler may delay retrieval of refrigerated items until after a hot beverage is produced, such that the refrigerated are not held too long at room temperature while waiting for the hot beverage to be produced. As the assembler retrieves the various products in the order, the assembler may mark (e.g., through the user interface 116 of the assembler device 108) the order as complete, updating both order data 126 and production data 130 to reflect that the order is assembled and ready to be delivered to the end customer. In some examples, the assembler or another user may provide further updates when the assembled order is delivered to and/or accepted by a customer.

In accordance with the above description, an order assembly platform 102 may provide for more efficient fulfillment of customer orders including products from multiple retailers, including made to order products. By coordinating between systems used by multiple retailers, the order assembly platform 102 may provide for monitoring of product production, allowing for multiple retailers to coordinate when providing products for a customer order. As the order assembly platform 102 provides for single orders from multiple retailers, the order assembly platform 102 may further provide more convenience as well as a more efficient ordering process to customers, saving time and computing resources.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A computer implemented method comprising:
receiving, at a computing device, an order comprising a plurality of products, the plurality of products comprising a first product, a second product, and a third product;
determining, by the computing device using stored retailer and order data, the first product and the third product are associated with a first retailer and the second product is associated with a second retailer;
grouping, by the computing device, the first product and the third product in the order into a product group based on a common characteristic;
transmitting, by the computing device, a first user interface to a first user device and a second user interface to a second user device, the first user interface displaying information about the order including the product group and the second user interface displaying information about the order including the product group, a first status indicator associated with the product group, the second product, and a second status indicator associated with the second product;
receiving, from the first user device, a first user input corresponding to an initiation of production of the first product in the product group;
in response to receiving the first user input, transmitting, by the computing device in real-time, a first updated second user interface to the second user device, the first updated second user interface displaying a change in a first appearance of the first status indicator associated with the product group to a second appearance to reflect the initiation, wherein the first appearance of the first status indicator is changed to the second appearance by filling in a displayed outline of the first status indicator;
receiving, from the first user device, a second user input corresponding to a completion of the production of the first product;
in response to receiving the second user input, transmitting, by the computing device in real-time, a second updated second user interface to the second user device, the second updated second user interface displaying a change in the second appearance of the first status indicator associated with the product group to a third appearance that reflects the product group is partially completed by filling in the displayed outline of the first status indicator an increased amount;
receiving, from the first user device, a third user input corresponding to a completion of the production of the third product in the product group;
in response to receiving the third user input, transmitting, by the computing device in real-time, a third updated second user interface to the second user device, the third updated second user interface displaying a change in the third appearance of the first status indicator associated with the product group to a fourth appearance to reflect the completion of the production of the product group by fully filling in the displayed outline of the first status indicator;
receiving, from the second user device, a fourth user input corresponding to an assembly of the order; and
in response to receiving the fourth user input, transmitting, by the computing device in real-time, a third user interface to third user device, the third user interface displaying a notification that the order including the first product, the second product, and the third product is complete.

2. The computer implemented method of claim 1, further comprising:
receiving, from a fourth user device, a fifth user input corresponding to an initiation of production of the second product;
in response to receiving the fifth user input, transmitting, by the computing device in real-time, a fourth updated second user interface to the second user device, the fourth updated second user interface displaying a change in a first appearance of the second status indicator associated with the second product to a second appearance to reflect the initiation;
receiving, from the fourth user device, a sixth user input corresponding to a completion of production of the second product; and
in response to receiving the sixth user input, transmitting, by the computing device in real-time, a fifth updated second user interface to the second user device, the fifth updated second user interface displaying a change in the second appearance of the second status indictor associated with the second product to a third appearance to reflect the completion of production of the second product.

3. The computer implemented method of claim 2, wherein the first user device is associated with the first retailer and the fourth user device is associated with the second retailer.

4. The computer implemented method of claim 1, wherein the first product is a food or beverage product.

5. The computer implemented method of claim 1, wherein the second appearance of the first status indicator reflects a percentage completion of the production of the product group.

6. The computer implemented method of claim 1, wherein the common characteristic comprises a department of origin within the first retailer, a made to order status, or special holding or handling requirements.

7. A system for coordinating assembly of orders including products originating from at least a first retailer and a second retailer, the system comprising:
one or more processors; and
memory encoding instructions which, when executed by the one or more processors of the system, cause the system to perform a method comprising:
receiving an order comprising a first product, a second product and a third product;
using stored retailer and order data, determining the first product and the third product are associated with the first retailer and the second product is associated with the second retailer;
grouping the first product and the third product in the order into a product group based on a common characteristic, the common characteristic comprising at least one of a department of origin within the first retailer, a made to order status, or special holding or handling requirements;
transmitting a first user interface to a first user device and a second user interface to a second user device, the first user interface displaying information about the order including the product group and the second user interface displaying information about the order including the product group, a first status indicator associated with the product group, the second product and a second status indicator associated with the second product;

receiving, from the first user device, a first user input corresponding to an initiation of production of the first product;

in response to receiving the first user input, transmitting a first updated second user interface to the second user device, the first updated second user interface displaying a change in a first appearance of the first status indicator associated with the product group to a second appearance to reflect the initiation, wherein the first appearance of the first status indicator is changed to the second appearance by filling in a displayed outline of the first status indicator;

receiving, from the first user device, a second user input corresponding to a completion of the production of the first product;

in response to receiving the second user input, transmitting a second updated second user interface to the second user device, the second updated second user interface displaying a change in the second appearance of the first status indicator associated with the product group to a third appearance to reflect the production of the product group is partially completed by filling in the displayed outline of the first status indicator an increased amount;

receiving, from the first user device, a third user input corresponding to a completion of the production of the third product in the product group;

in response to receiving the third user input, transmitting a third updated second user interface to the second user device, the third updated second user interface displaying a change in the third appearance of the first status indicator associated with the product group to a fourth appearance to reflect the completion of the production of the product group by fully filling in the displayed outline of the first status indicator;

receiving, from the second user device, a fourth user input corresponding to an assembly of the order; and in response to receiving the fourth user input, transmitting a third user interface to a third user device, the third user interface displaying a notification that the order including the first product, the second product, and the third product is complete.

8. The system of claim 7, wherein the method performed by the system further comprises:

receiving, from a fourth user device, a fifth user input corresponding to an initiation of production of the second product;

in response to receiving the fourth user input, transmitting a fourth updated second user interface to the second user device, the fourth updated second user interface displaying a change in a first appearance of the second status indicator to a second appearance to reflect the initiation;

receiving, from the fourth user device, a sixth user input corresponding to a completion of production of the second product; and in response to receiving the sixth user input, transmitting a fifth updated second user interface to the second user device, the fifth updated second user interface displaying a change in the second appearance of the second status indictor to a third appearance to reflect a the completion of production of the second product.

9. The system of claim 8, wherein the first user device is associated with the first retailer and the fourth user device is associated with the second retailer.

10. The system of claim 7, wherein the first product is a food or beverage product.

11. The system of claim 7, wherein the information about the order includes an estimated time of arrival for a customer placing the order.

12. A computer implemented method comprising:

receiving, from a customer device, an order including a first product and a second product originating from a first retailer and a third product originating from a second retailer;

transmitting, to an assembler device, a first user interface comprising a first status indicator associated with the first product and the second product and a second status indicator associated with the third product, wherein the first status indicator has a first appearance and the second status indicator has a second appearance;

receiving, from a first retailer device associated with the first retailer, a first user input corresponding to a completion of production of the first product;

based on receiving the first user input, transmitting, to the assembler device, a first updated first user interface that displays an update to the first appearance of the first status indicator to a third appearance to reflect the completion of the production of the product and the second product is partially completed by partially filling in a displayed outline of the first status indicator;

receiving, from a second retailer device associated with the second retailer, a second user input corresponding to a completion of the third product;

based on receiving the second user input, transmitting a second updated first user interface to the assembler device, the second updated first user interface that displays an update to the second appearance of the second status indicator to a fourth appearance to reflect a the completion of production of the third product by fully filling in a displayed outline of the second status indicator;

receiving, from the first retailer device associated with the first retailer, a third user input corresponding to a completion of production of the first product and the second product;

based on receiving the third user input, transmitting to the assembler device, a third updated first user interface that displays an update to the third appearance of the first status indicator to a fifth appearance to reflect the production of the first product and the second product is completed by fully filling in a displayed outline of the first status indicator;

receiving, from the assembler device, a fourth user input corresponding to assembly of the order; and based on receiving the fourth user input, transmitting to the customer device, a second user interface that includes a notification that the order including the first product, the second product and the third product is complete.

13. The computer implemented method of claim 12, further comprising:

receiving, from the first retailer device, a fifth user input corresponding to an initiation of production of the first product; and based on receiving the fifth user input, transmitting to the assembler device, a fourth updated first user interface that displays an update to a sixth appearance of the first status indicator to the first appearance to reflect the initiation.

14. The computer implemented method of claim 12, wherein the first retailer and the second retailer share a physical location.

15. The computer implemented method of claim 12, wherein the first product is a food or beverage product.

16. The computer implemented method of claim 12, wherein the third updated first user interface displays an estimated time of arrival for a customer placing the order.

* * * * *